United States Patent [19]

Schneider et al.

[11] 4,210,428
[45] Jul. 1, 1980

[54] GAS SCRUBBING PLANT AND BAFFLES THEREFOR

[75] Inventors: Jürg Schneider, Muttenz; Volker Fattinger, Arlesheim, both of Switzerland

[73] Assignee: Ciba-Geigy Corporation, Ardsley, N.Y.

[21] Appl. No.: 963,555

[22] Filed: Nov. 24, 1978

[30] Foreign Application Priority Data

Nov. 29, 1977 [CH] Switzerland .................... 14584/77

[51] Int. Cl.² ........................................ B01D 47/10
[52] U.S. Cl. .................................. 55/223; 55/226; 261/98; 261/116; 261/118; 261/DIG. 9; 261/DIG. 54
[58] Field of Search ............... 261/116, 118, 97, 110, 261/DIG. 54, DIG. 9, 98; 55/220, 223, 226, 233, 257 R

[56] References Cited

U.S. PATENT DOCUMENTS

| 3,116,348 | 12/1963 | Walker ................. 261/DIG. 54 |
| 3,199,267 | 8/1965 | Hausberg .............. 261/DIG. 54 |
| 3,507,626 | 4/1970 | Van Horn ............. 261/DIG. 54 |
| 3,517,485 | 6/1970 | Dell'Agnese et al. ........ 55/226 |
| 3,601,374 | 8/1971 | Wheeler ................ 261/DIG. 54 |
| 3,737,106 | 6/1973 | Arnold et al. ......... 261/DIG. 54 |
| 3,767,174 | 10/1973 | Heeney .................. 261/DIG. 54 |
| 3,768,234 | 10/1973 | Hardison .............. 261/DIG. 54 |
| 3,782,080 | 1/1974 | Gallagher ............. 261/DIG. 54 |
| 3,881,898 | 5/1975 | Darby et al. ............ 261/98 X |
| 3,998,612 | 12/1976 | Lundy .......................... 55/220 |

FOREIGN PATENT DOCUMENTS

| 2049901 | 4/1972 | Fed. Rep. of Germany ... 261/DIG. 54 |
| 15318 | 6/1912 | France ...................... 261/DIG. 54 |
| 2180822 | 11/1973 | France ...................... 261/DIG. 54 |
| 1377026 | 12/1974 | United Kingdom .......... 261/DIG. 54 |

*Primary Examiner*—Richard L. Chiesa
*Attorney, Agent, or Firm*—Harry Falber

[57] ABSTRACT

A gas scrubbing plant having a gas scrubbing stage, a washing liquid separating stage and a stage for washing out suspended matter therebetween. This latter stage includes a plurality of gas baffles which accelerates the gas and then decelerates it while liquid is introduced into the gas baffles as the gas passes therethrough. Each baffle has an inner conical member surrounded by an outer member to define therebetween an annular passage with diverges at an angle of between 10° and 90° from the inlet adjacent the apex of the conical member to the outlet from the baffle, the cross-sectional area of the annular passage decreasing in the direction of gas flow and then increasing towards the outlet. A liquid feed tube is mounted in the conical member and a disc mounted at the outlet of the tube opposite the apex to the conical member so that the liquid fed into the tube is deflected and produces a rotationally symmetrical jet up into the annular passage in the direction of gas flow from the inlet to the outlet.

10 Claims, 6 Drawing Figures

Fig.2 (I-I)

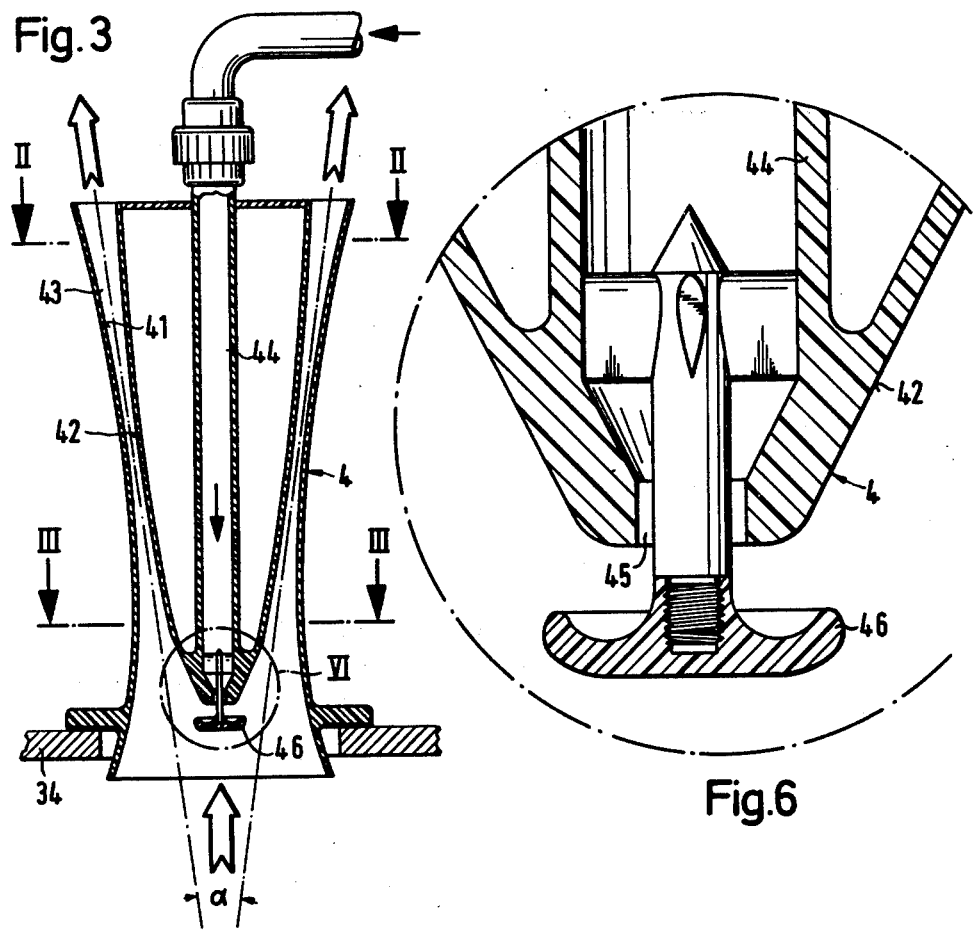
Fig. 3
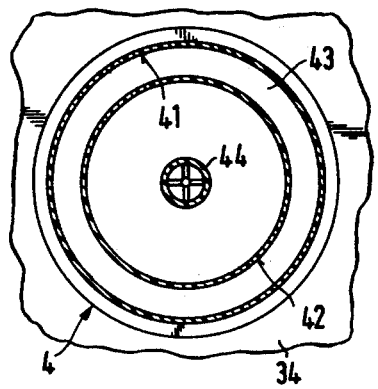
Fig. 4 (II-II)
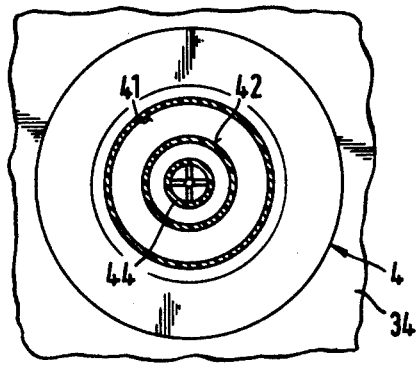
Fig. 5 (III-III)
Fig. 6

4,210,428

GAS SCRUBBING PLANT AND BAFFLES THEREFOR

GAS SCRUBBING PLANT AND BAFFLES THEREFOR

This invention relates to a gas scrubbing plant and in particular to novel forms of baffles for use in such plants.

Gas scrubbing plants for washing out dust and impurities in mist form require a high energy consumption if high separating efficiencies are to be obtained with particle sizes of about 1 μm and less. It is a well-known gas scrubbing principle to inject liquid into the gas at high gas speed, the liquid being broken up by the current of gas and absorbing impurities from the gas as a result. The power consumption in such gas scrubbing plants is due primarily to the fan, because sufficiently high pressure differences must be produced in the gas flow to ensure the necessary gas acceleration upstream of the gas scrubbing zone. If large quantities of gas have to be purified, as is the case, for example, in the aluminum industry, the power costs for the fans play an important part as a cost factor.

It is known to divide large gas flows up into cylindrical or stratified sub-flows before purification. This gives some power saving but relatively complicated apparatus is the result, which is likely to clog. A central problem of such gas scrubbers is homogeneous distribution of the liquid in the gas acceleration zone. Although liquid nozzles with swirl means and narrow passages give a good distribution of the liquid, they are likely to clog. The problem of clogging is a particularly difficult one in the purification of waste gases from the aluminum industry, because in addition to fluorine-containing salts, tar is also present in the waste gas in the form of fine particles and originates from the electrodes of the aluminum electrolysis furnaces. Waste gases from industrial incineration plants, particularly garbage incinerators, also contain fine tar particles in many cases in addition to salts and oxides.

PRIOR ART

U.K. Pat. No. 1,377,026 and DOS No. 2,049,901 disclose gas scrubber plants with a plurality of gas baffles disposed in parallel in a scrubbing tower. The gas baffles each consist of a double-conical venturi tube, on the entry side of which a conical insert is disposed to be axially adjustable. Adjustment of the insert varies the width of the annular gap formed between the insert and the venturi tube cone on the inlet side. In the gas baffles in these known gas scrubbers, unlike the invention, the annular gap is not situated in that part of the baffle which widens out in the direction of gas flow, but in the narrowing part thereof, and this has considerable disadvantages. Nor do these scrubbers have any means of introducing a rotationally symmetrical liquid jet into the annular gap; instead, the water is simply sprayed into the gas entering the baffles.

French Patent Application No. 2,180,822 discloses a venturi tube gas scrubber which also has an axially adjustable insert in the tapering cone on the gas inlet side, such insert co-operating with the tube wall to define an annular gap. The insert is constructed as a spray nozzle by means of which liquid can be introduced into the gas flow. Apart from the fact that this known gas scrubbing plant comprises only a single gas baffle and not a plurality thereof, and said gas baffle has the annular gap on its inlet side and not, as in the invention, on its outlet side, which widens out conically, the nozzle-like construction of the insert is unsuitable for producing a rotationally symmetrical liquid jet.

U.S. Pat. No. 3,517,485 also discloses a gas scrubber with a single venturi tube. That part thereof which widens out has a cylindrical insert which tapers conically at its tip, a peripheral slot being provided in the transition between the cylindrical part and the conical part, the water being sprayed radially outwards and with a component in opposition to the direction of the gas flow, into the latter as it moves through the annular gap. Here the water is introduced directly at the narrowest point of the annular gap and not upstream thereof as in the invention. The shape of the peripheral slot, which is interrupted by numerous spacer elements, does not enable a coherent rotationally symmetrical jet of liquid to form. Furthermore, the water emerging from the slot has a component directed in opposition to the direction of gas flow, so that the jet of liquid is immediately broken up by the gas flow and is not introduced into the annular gap cohesively and uniformly.

U.S. Pat. No. 3,998,612 describes a gas scrubber plant in which two plates are so constructed and disposed in a tubular scrubbing tower as to form a flat annular passage, which narrows radially outwardly and then widens out again, after the style of a venturi tube. The gas for purification passes through a central aperture in the bottom plate into the passage between the two plates, and then flows substantially horizontally radially outwards and finally leaves the annular venturi passage at its periphery. An annular nozzle is disposed on the axis of the annular venturi passage for injection of water into the passage. Thus in this known scrubber, the venturi passage is not conical with an opening angle of less than 90°, as in the case of the invention, but practically even. In addition, the complete plant comprises just a single gas baffle and not a plurality thereof.

SUMMARY OF THE INVENTION

In this invention the scrubbing plant includes a plurality of gas baffles each of which comprises a conical portion inside and coaxial with an outer portion to define an annular passage therebetween which diverges from the axis of the gas baffle from the inlet to the outlet. The cross sectional area of the annular passage increases towards the outlet and a liquid jet means is provided at the inlet to the baffle which impinges on a deflector disc and to produce a rotationally symmetrical film of liquid in the same direction as the gas flow through the baffle.

It has been found that a gas scrubbing plant constructed and operated as described in this Specification gives separation efficiencies of 95% and more—referred to the total solids content of tar-containing waste gases—with a power consumption in the gas scrubbing plant of less than 30 mbar pressure loss in the gas flow. This 30 mbar pressure loss is measured between the inlet and outlet of the gas scrubber. The plant according to the invention proved clog-proof despite the presence of tar in mist form.

BRIEF DESCRIPTION OF DRAWINGS

A preferred embodiment of the invention is explained in detail hereinafter with reference to the drawings wherein:

FIG. 2 is a section on the line I—I in FIG. 1.

FIG. 3 is a detail of FIG. 1.

FIGS. 4 and 5 are sections on the lines I—I and III—III in FIG. 3, and

FIG. 6 is a detail of FIG. 3.

DETAILED DESCRIPTION OF PREFERRED EMBODIMENT

Figure 1:
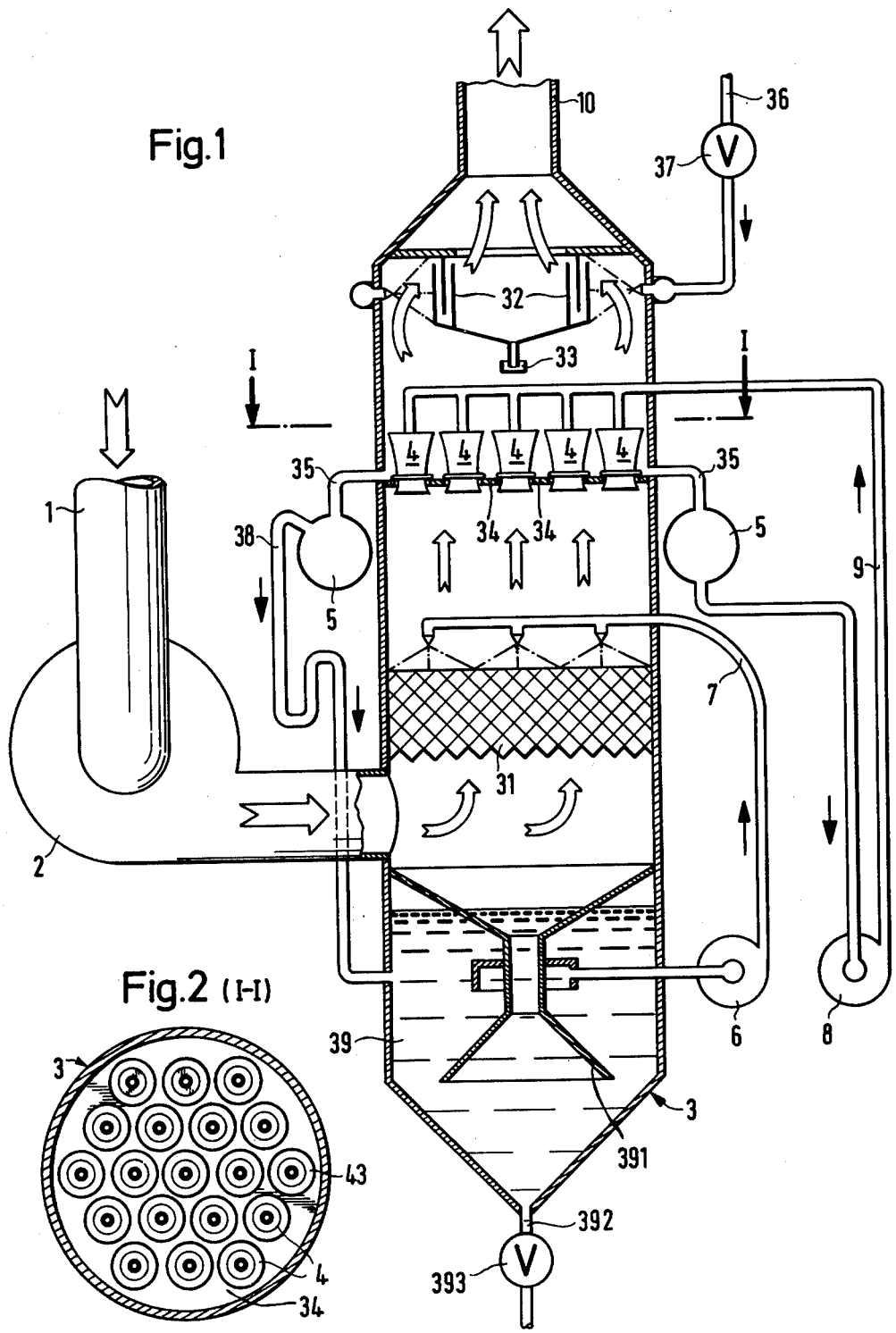
FIG. 1 is a diagrammatic section of one exemplified embodiment.

Referring to FIG. 1, the gas scrubbing plant comprises at least one scrubbing stage 31 provided with a layer of packing material, and at least one stage 4 for washing out suspended matter. In the latter stage, the gases are accelerated to a speed of more than 30 meters per second, and then decelerated, between guide surfaces spaced less than 50 mm apart, whereupon the gases are fed to means 32 for separating the scrubbing liquid. The gases then flow via pipe 1 to the fan 2 and then into the gas scrubbing plant 3, through which they flow upwards. They are discharged via the chimney 10. The pump 6 and the pipe 7 are used to circulate liquid over the layer 31 of packing material. The injection liquid for the separation of suspended matter is delivered to the gas baffles 4 by the pump 8 via the pipe 9. The liquid entrained by the gas is fed to the drip catcher 32 and then via the immersion seal 33 to the partition 34 and then via pipe 35 to the header 5 and back to pump 8. Water can be injected via pipe 36 and valve 37 upstream of the drip catcher 32. The addition of water results in a rise in the level of liquid in the header 5, so that liquid flows off via the overflow pipe 38 to the sump 39. The fittings 391 improve the sludge separation in the sump 39. The sludge that has settled out is removed from the scrubbing system via the pipe 392 and the valve 393. Hedgehog packings according to DOS No. 24 16 955, for example, are suitable packings for the scrubbing stage 31. However, moving packings may alternatively be used in the packed scrubbing stage 31, e.g. spherical plastic packings of the kind already used in the aluminium industry.

A drip catcher of the type explained in DOS No. 23 24 520 is particularly suitable as a drip catcher 32.

According to the invention, gas baffles 4 are used to accelerate and then decelerate the gases. Each baffle 4 comprises as inner substantially conical portion 42 whose service approximates to a parabaloid and an outer portion 41 whose surface approximates to a hyperboloid so that an annular passage 43 for gas is formed which from the entrance narrows and then widens towards the gas outlet, that is to say, the radii of the passage increases towards the gas outlet. The gas baffle 4 contains a tube 44 through which liquid flows in opposition to the direction of flow of the gas. An annular liquid exit slot 45 is situated at the end of the tube 44.

The annular jet of liquid rebounds on the liquid deflector disc 46, where it forms a rotationally symmetrical film of liquid before being sprayed into the gas flowing into the gas baffle 4. The breaking up of the jet of liquid into the form of a surface gives a homogeneous distribution of the liquid at the place of the maximum gas speed. This ideal liquid distribution is obtained despite minimum pressure utilization in the distribution system. A pressure of about 0.5 bar in the tube 44 is quite sufficient. The minimum spacing between the inner and outer conical gas baffle surfaces 41 and 42 in FIG. 3 is less than one-fifth of the length of the gas path measured from the outer edge of the liquid deflector disc 46 to the exit from the gas baffle 47.

It has been found advantageous to use a high gas speed in the gas scrubber stage 31. The gas speed should be in excess of 1.5 meters per second, referred to the free cross-section of the scrubber.

It is advisable to provide the maximum possible number of gas baffles 4 in order to break the gas flow up into numerous thin sub-flows. Very high separation efficiencies are achieved if the minimum spacing between the inner and outer conical gas baffle surfaces 41 and 42 is less than 3 cm.

To reduce the resistance to flow and minimize the space requirements, the conical annular duct 43 formed by the two gas baffle surfaces 41 and 42 has an average diverging angle $\alpha$ of about 10° to 90°, preferably about 10° to 20° referred to the inlet as shown in FIG. 3.

Measurements have shown that intensive injection of liquid improves separating efficiency. The injection of more than 2 liters of liquid per $Nm^3$ of gas through the annular exit slot 45 gives a considerable increase in separating efficiency.

With the invention it is possible to purify the gas flow in a number of identical gas baffles 4. These baffles can be mass produced, plastics such as polypropylene or polyethylene being particularly advantageous. Thermoplastics of this kind can be injection moulded and a plurality of parts produced in this way can be combined to construct a gas baffle. This type of production results in surprisingly low costs compared with other gas scrubbing systems.

In the purification of waste gases from furnaces for electrolytic aluminium production it has been found that the waste gas purity obtainable in a plant according to the invention with a pressure of 30 mbar could not be obtained in known venturi scrubbers except at a pressure of above 50 abar. With the large gas flows requiring purification, this means a considerable saving in electrical power costs.

What is claimed is:

1. A baffle for a gas scrubbing plant comprising a substantially conical inner member with a continuously smooth-curved outer surface located coaxially within an outer member with a continuously smooth-curved inner surface to define between the outer surface of the inner member and the inner surface of the outer member an annular passage, the inner surface of said outer member being shaped so that the cross sectional area of the annular passage from the apex of the conical member defining the inlet to the baffle decreases and then increases towards the outlet of the baffle defined by the base portion of the inner member and the top of the outer member and the annular passage diverges upwards from the inlet to the outlet at an angle in the range of 10° to 90°; said baffle further including a feed tube coaxial with said inner member and having an outlet at the apex thereof and a disc mounted in front of said outlet to deflect liquid supplied by said tube into a rotationally symmetrical jet directed up into said annular passage.

2. A gas scrubbing plant comprising a scrubbing stage provided with packings, a stage for washing out suspended matter, a washing liquid separating stage, the suspended matter washing stage comprising a plurality of gas baffles, accelerating and then decelerating gas flow therethrough, and means for introducing a liquid into the gas baffles, wherein each gas baffle has an inlet thereto and an outlet therefrom and includes two coaxial continuously smooth-curved guide surfaces defining an annular passage diverging from the inlet toward the outlet, the mean angle of divergence being in the range of 10° to 90°, and the cross-sectional area of the annular passage decreasing in the direction of gas flow from the inlet and then increasing towards the outlet and the mean radius of the cross-sectional area increasing in the direction towards the outlet the liquid introduction means including means to produce a rotationally symmetrical liquid jet substantially parallel to the guide surfaces and in the same direction as the flow of gas through the baffle and comprising a deflector disc centrally disposed on the gas inlet side of the gas baffle and an axial feed tube through which liquid is fed onto the deflector disc in a direction opposite to that of the gas flow and is then deflected by the deflector disc rotationally symmetrically into the direction of the gas flow.

3. A plant according to claim 2, wherein the minimum spacing between the guide surfaces is at maximum equal to one-fifth of the axial length of the gas baffle.

4. A plant according to claim 3, in that the minimum spacing between the two guide surfaces is at maximum 50 mm.

5. A plant according to claim 2, wherein the outer guide surface of each gas baffle is shaped as a hyperboloid.

6. A plant according to claim 5, wherein the inner guide surface of the gas baffle is shaped as a paraboloid.

7. A plant according to claim 6, wherein the gas baffles are assembled from thermoplastic injection mouldings.

8. A plant according to claim 2, including means for producing a gas speed in the scrubbing stage in excess of 1.5 meters per second referred to the free total cross-section of the stage.

9. A plant according to claim 8, wherein the annular passages of the gas baffles are dimensioned to accelerate the gas to speeds of at least about 30 meters per second in the gas baffles.

10. A plant according to claim 2, including means to feed at least two liters of liquid per $Nm^3$ of gas into said axial feed tubes to be sprayed into the annular passages of said baffles.

* * * * *